April 20, 1965   C. D. BRADLEY   3,178,937
TEMPERATURE COMPENSATOR FOR HYDRAULIC PRESSURE DEVICES
Filed July 10, 1963   2 Sheets-Sheet 1
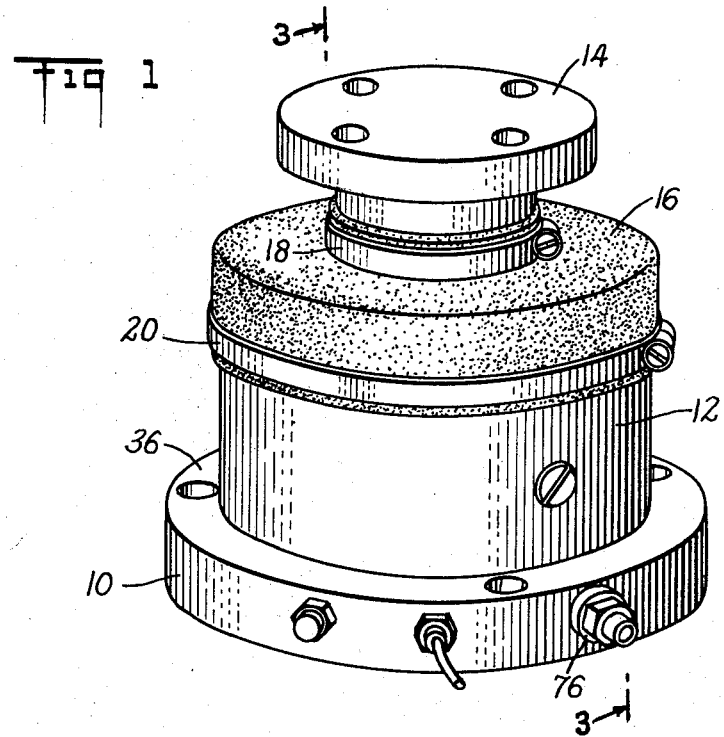
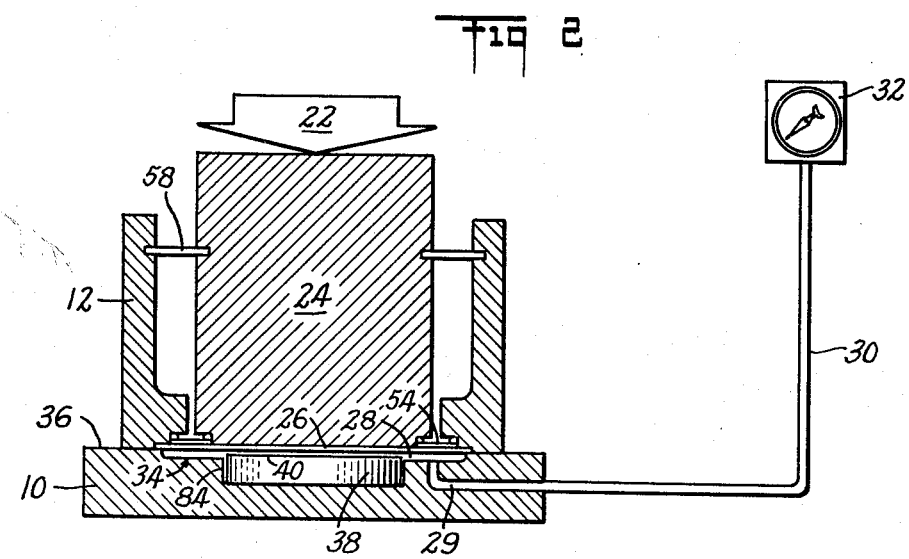
INVENTOR
Chester D. Bradley
BY
Blair + Buckles
ATTORNEYS April 20, 1965  C. D. BRADLEY  3,178,937
TEMPERATURE COMPENSATOR FOR HYDRAULIC PRESSURE DEVICES
Filed July 10, 1963  2 Sheets-Sheet 2
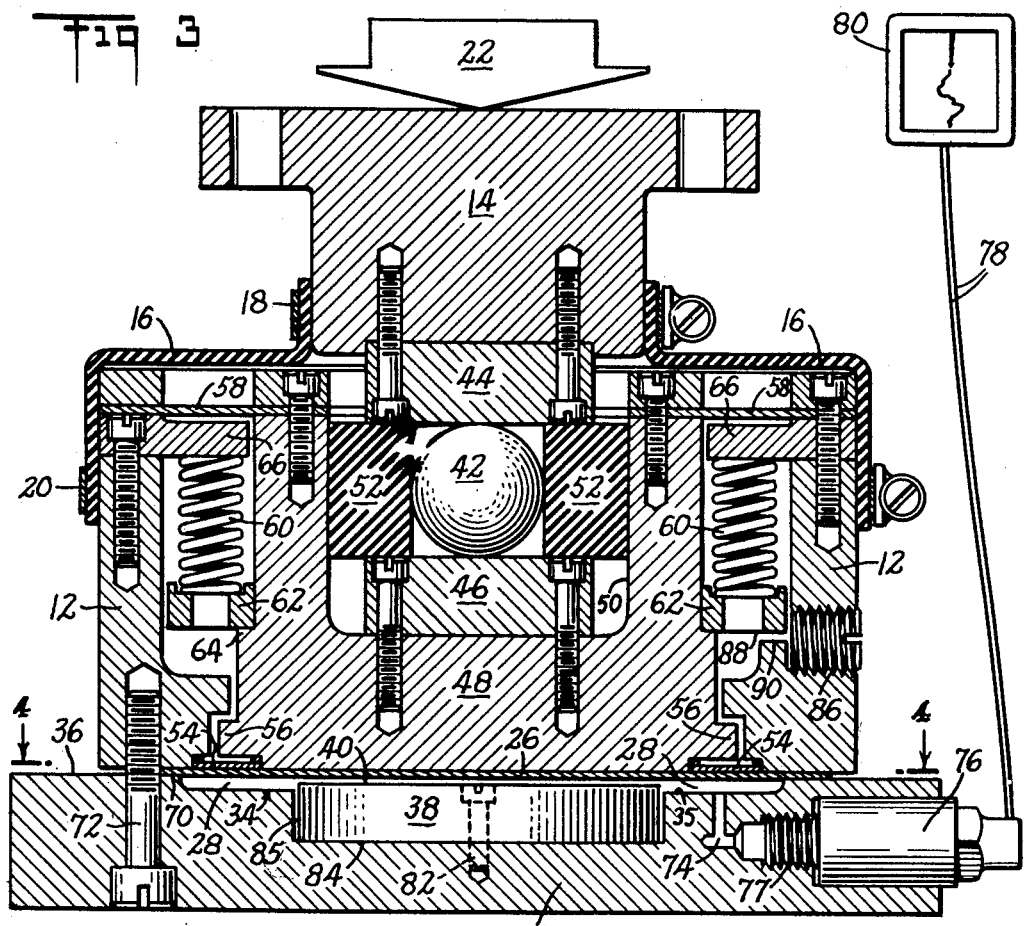
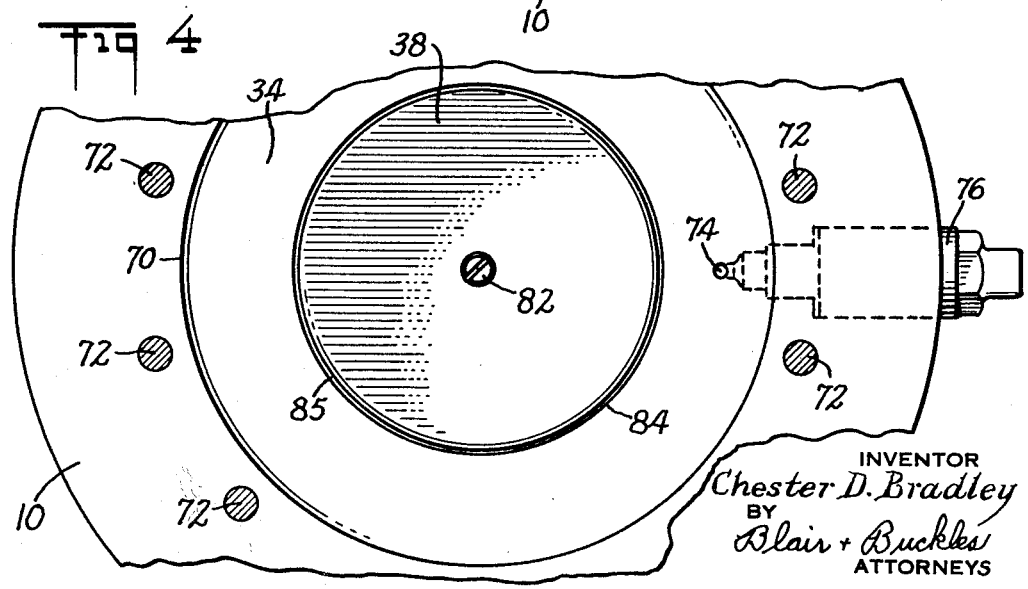
INVENTOR
Chester D. Bradley
BY
Blair + Buckles
ATTORNEYS ର
United States Patent Office 3,178,937
Patented Apr. 20, 1965

---

3,178,937
TEMPERATURE COMPENSATOR FOR HYDRAULIC PRESSURE DEVICES
Chester D. Bradley, Darien, Conn., assignor to The A. H. Emery Company, New Canaan, Conn.
Filed July 10, 1963, Ser. No. 294,117
2 Claims. (Cl. 73—141)

This invention relates to hydraulic load cells and more particularly to means for maintaining the accuracy of such load cells under varying ambient temperatures by compensating for differences in the coefficients of expansion of the hydraulic fluid and the parts of the load cell forming a confining chamber for the fluid.

Hydraulic load cells have a wide range of application in measuring weight or force. Such load cells have been in wide use for measuring the weights of tanks, hoppers, railroad cars, and the like as well as the thrust of jet or rocket engines. Such load cells in general comprise a hydraulic fluid chamber which supports the weight or force to be measured, with an outlet from this chamber connected to a gage, transducer or the like to translate hydraulic fluid pressure in the chamber to a weight or force value either at the load cell or remotely therefrom.

Hydraulic load cells are operative under a wide variety of temperature conditions, and the ambient temperature in which the load cell may operate has heretofore created a problem in maintaining the integrity of weight or force information transmitted therefrom. A hydraulic load cell used for continuous weighing of an outdoor storage tank may be subjected to temperatures ranging from —40° F. to 100° F. or greater. Such a load cell may be used in a refinery for continuously weighing hot distillate, or in a foundry for weighing ladles of molten metal, and accordingly may be subjected to even higher ambient temperatures.

Under such widely varying temperature conditions a problem arises in maintaining load cell accuracy because of the expansion of the hydraulic fluid therein. The coefficient of expansion of the hydraulic fluid is greater than the coefficient of expansion of the material confining the fluid. Thus, with a rise in temperature the volume of fluid within the cell increases at a greater rate than the fluid chamber expands, and consequently an increase in hydraulic fluid pressure from the chamber is experienced at the transducer or gage.

Thus, the fluid is contained in a closed hydraulic circuit, and when exposed to a temperature change, must accommodate the resulting changes in volume of the fluid and its confining chambers. The cubical expansion of typical hydraulic fluids used in load cells is much greater than that of the metals which confine the fluid. When temperature increases, for example, an excess volume of fluid results. In a closed hydraulic load cell weighing system the load cell piston is moved by means of a diaphragm to provide the required volume increase in the fluid confining chamber. This volume change and the resulting piston movement is reflected as an error in load indication equal to the force required to move the piston to its new position.

Accordingly, it is an object of this invention to provide means for maintaining greater accuracy in hydraulic load cells.

Another object of the invention is to provide means of the above character which compensates for a change in hydraulic fluid volume in a hydraulic load cell with changes in temperature.

A further object of the invention is to provide temperature compensating means of the above character wherein the hydraulic fluid confining chamber is exposed to a temperature compensating insert.

Another object of the invention is to provide a temperature compensating means of the above character in which the insert is made of a material having a smaller coefficient of expansion than the surrounding material comprising a portion of the fluid confining chamber.

A further object of the invention is to provide temperature compensating means of the above character wherein the insert also serves as a rest plateau for the load cell diaphragm.

Other objects of the invention will in part be obvious and will in part appear hereinafter.

The invention accordingly comprises the features of construction, combinations of elements, and arrangement of parts which will be exemplified in the constructions hereinafter set forth, and the scope of the invention will be indicated in the claims.

For a better understanding of the nature and objects of the invention, reference should be had to the following detailed description taken in connection with the accompanying drawings, in which:

FIGURE 1 is a perspecttive view of a hydraulic load cell;

FIGURE 2 is a sectional diagrammatic view of a hydraulic load cell and gage in accordance with the present invention; and FIGURE 3 is an enlarged sectional view of the load cell taken along lines 3—3 of FIGURE 1.

FIGURE 4 is a fragmentary top sectional view taken along lines 4—4 of FIGURE 3.

Referring now to FIGURE 1, it will be seen that the hydraulic load cell comprises a base 10 which supports a cylindrical casing 12. At the top of the load cell a loading head 14 may be in the form of a flat topped plate for supporting weight or force to be measured by the cell. A boot 16 which may be of rubber or like material is secured to the load head 14 by a clamp 18 and to the casing 12 by a clamp 20 to seal the interior of the load cell against dust and dirt.

As shown schematically in FIGURE 2, a weight or force indicated by the arrow 22 bears upon the load cell force receiving element 24 which transmits the weight or force through a thin steel diaphragm 26 to the hydraulic fluid contained in chamber 28. This increase in hydraulic pressure may be transmitted via a passage 29 in the base 10 and tubing 30 to a gage 32 for indication of the weight or force indicated by arrow 22. The chamber 28 is preferably formed as a depression 34 in the top surface 36 of base 10 as will be more fully described hereinafter.

As pointed out above such hydraulic load cells may be operated in an ambient temperature which varies over a range of several hundred degrees Fahrenheit. These changes in temperature cause the hydraulic fluid in the chamber 28 to expand. The material of the base 10, which may be of aluminum, also expands but by a considerably smaller amount. This is due to a difference in the coefficients of expansion of the hydraulic fluid and the base material, and a change in pressure is experienced at the gage 32 by a change in temperature which bears no relation to the amount of force or weight supported by the load cell. The hydraulic fluid, for example, may have a coefficient of expansion 10–15 times that of the base metal.

The resulting inaccurate indication of force or weight due to changes in temperature are compensated for by the present invention. This has been accomplished by providing an insert 38 which is imbedded in the base 10, and the top 40 of which is exposed to the hydraulic fluid in the chamber 28. The insert 38 has a substantially lower coefficient of expansion than the material of the base 10 to compensate for the change in hydraulic fluid volume with changes in the ambient operating temperature of the load cell.

Referring now to FIGURES 3 and 4, the invention will be described in more detail. The loading head 14 transmits weight or force from the arrow 22 through a rolling ball 42 which bears on plates 44 and 46, which are secured to the load head 14 and piston 48 respectively. The ball is preferably positioned within a well or recess 50 within the piston and is surrounded by an annular resilient centering ring 52 which is fitted into the recess 50. The weight or force transmitted through loading head 14 and piston 48 is further transmitted to the hydraulic fluid in chamber 28 through the thin steel diaphragm 26 which supports the piston 48. Around the periphery of piston 48 a bridge ring assembly 54 guides and stabilizes the lower end of the piston and permits a slight pivoting action between the peripheral piston flange 56 and the bridge ring 54 as the diaphragm 26 is deflected to vary the fluid pressure in chamber 28.

The piston 48 is guided and stabilized within the top of casing 12 by a stay plate 58 which is made of a relatively thin sheet of metal to permit vertical movement of the piston while preventing lateral movement thereof. A number of preload springs 60 surround the piston and are seated at their lower ends in an annular spring seat 62 which rests on piston shoulder 64. The springs are held under compression by an annular spring clamp 66 which is secured to the cylindrical casing 12.

For a more detailed description of the purpose and function of the above hydraulic load cell features, see U.S. Patent No. 2,960,328.

Still referring to FIGURES 3 and 4, it will be seen that the fluid chamber 28 formed by the recess 34 in base 10 and the diaphragm 26, which is sealed around its periphery 70 between the casing 12 and base 10 by bolts 72, is in fluid communication with passageway 74 which terminates at a pressure sensing transducer 76 which may be secured in a recess 77 in the base 10. The transducer 76 converts hydraulic fluid pressure from the chamber 28 to an electrical signal which may be carried by wires 78 to a remotely located indicator or recorder 80 for the measured force or weight on the load cell.

Location of the transducer 76 in or near the load cell base is preferred since the hydraulic fluid involved in the load cell system is all contained in or near the load cell itself and will be subjected to the same temperatures as the base and insert. In the embodiment shown in FIGURE 2 the fluid in line 30 and gage 32 may be subjected to different temperatures than the load cell in some instances and thus contribute to inaccuracy, unless the line and gage also are provided with temperature conpensation.

The temperature compensating insert 38 is positioned in the base 10 and secured by screw 82, with the top 40 of the insert in hydraulic fluid chamber 28. The depression 84 in the base 10 should be of an oversized diameter of about .020 inch to provide a clearance 85 of about .010 inch around the insert 38. The depression 84 is generally formed at room temperature and such an allowance permits shrinkage of the base around the insert without interference. The clearance space 85 is also filled with fluid and will vary in width with changes in temperature, as the base expands or contracts with relation to the insert.

The insert 38 is seated in the recess 84 so that its top 40 protrudes above the depression bottom surface 35. Thus the insert 38 serves another purpose, to provide a rest or "plateau" for the diaphragm 26 if the load cell is overloaded or if the cell has an insufficient amount of fluid in chamber 28. When the load cell has little or no fluid in the chamber 28, the insert plateau greatly facilitates the filling of the load cell chamber with hydraulic fluid. With the diaphragm 26 resting on the insert the chamber area around the insert lifts the diaphragm to permit filling of the cell without excessive filling pressures.

The insert should protrude from the bottom 35 of the depression 34 a distance to permit free vertical movement of the diaphragm 26 from the horizontal, which may be .005 inch, for the load cell weight range. The insert, for example, may protrude into chamber 28 .005 inch when the depth of depression 34 is .020 inch.

Metals or other materials with extremely low coefficients of cubical expansion are used for insert materials. When using those materials which have coefficients of expansion a tenth or less of the coefficient of cubical expansion of the base, insert expansion is negligible. Typical examples of metal alloys for the base and insert are shown in Table I.

TABLE I

| Base | | Insert | |
|---|---|---|---|
| Percent | Matl. | Percent | Matl. |
| Min. | Max. | | | Max. .12 | Carbon. |
| | .50 | Silicon | .35 | Manganese. |
| | .50 | Iron | Max. .20 | Silicon. |
| 3.80 | 4.90 | Copper | 36.00 | Nickel and Cobalt. |
| .30 | .90 | Manganese | .20 | Selenium. |
| 1.20 | 1.80 | Magnesium | Remainder | Iron. |
| | .10 | Chromium | | |
| | .10 | Zinc | | |
| .05 ea. | .15 tot. | Others | | |
| Remainder | | Aluminum | | |

With the above compositions of base and insert material, the coefficient of cubical expansion for the base, insert and typical hydraulic fluid are as follows:

TABLE II

*Cubical coefficient of expansion*

[Average values over 0° to 100° F. temp. range]

Base metal (Table I) = .0000372 in.$^3$/in.$^3$/° F.
Insert metal (Table I) = .0000027 in.$^3$/in.$^3$/° F.
Hydraulic fluid = .00043 in.$^3$/in.$^3$/° F.

It will thus be seen that the coefficient of cubical expansion of the hydraulic fluid is approximately 11.6 times that of the material of the load cell base, with the insert expansion being negligible. Thus, the much greater expansion of the fluid with a rise in temperature results in increased fluid pressure because of the correspondingly smaller increase in size of the chamber 28 as the base expands, unless compensation is provided. The insert, having a coefficient of expansion considerably below that of the base material, displaces a predetermined volume of fluid in the chamber 28 such that the expansion of the remaining fluid volume, upon a rise in ambient temperature of the load cell, is precisely accommodated by the thermal expansion of the chamber.

The following formula can be used to accurately ascertain the volume to be occupied by the insert:

$$ax = by - cz$$

wherein:

$a$ = coefficient of expansion of fluid (in.$^3$/in.$^3$/° F.)
$b$ = coefficient of expansion of base (in.$^3$/in.$^3$/° F.)
$c$ = coefficient of expansion of insert (in.$^3$/in.$^3$/° F.)
$x$ = volume of fluid (in.$^3$)
$y$ = volume of fluid chamber (in.$^3$)
$z$ = volume of insert (in.$^3$)

If the fluid volume is 1 in.$^3$ then $$y = z + 1$$

so that $$a = b(z+1) - cz$$

With the numerical values from Table II:

$$.00043 = .0000372z - .0000027z + .0000372$$
$$.0000345z = .0003928$$
$$z = 11.3855 \text{ in.}^3$$
$$y = 12.3855 \text{ in.}^3$$

It will thus be seen that the insert should occupy a volume which is proportional to the volume occupied by the hydraulic fluid at a mean temperature times the ratio of the cubical coefficients of expansion of the hydraulic fluid and the base material. For more accurate determinations the expansion of the insert may be also considered as shown above.

The following example illustrates the effectiveness of the invention in maintaining hydraulic load cell accuracy over a substantial range of ambient operating temperatures.

EXAMPLE I

A prior art hydraulic load cell without a compensating insert was compared with an identical hydraulic load cell having a compensating insert as described above over a range of varying temperatures. Both load cells were unloaded, with pressure being exerted on the hydraulic fluid from the preload springs 60 only. Each cell was gaged through gaging hole 86 between the gaging extension surface 88 of spring seat 62 and the gaging extension surface 90 of the casing 12. The results were as follows:

| Prior Art Cell | | Cell with Temperature Compensator | |
|---|---|---|---|
| Temp., °F. | Gaging (inches) | Temp., °F. | Gaging (inches) |
| +128.5 | .0325 | +129 | .03033 |
| +75 | .0305 | +72 | .03033 |
| +30 | .0295 | +32 | .03033 |
| −20 | .0280 | −21 | .03066 |

As shown in the above example, the hydraulic load cell without the temperature compensating insert showed a piston movement, relative to the casing, of .0045 inch for a 148.5° Fahrenheit temperature change while the load cell provided with the temperature compensating insert showed a change of piston position of only .00033 inch for a 150° Fahrenheit temperature change. Thus, the prior art load cell did not accommodate the change in volume of the hydraulic fluid as did the cell made in accordance with the invention. This increase in volume of hydraulic fluid results in increased hydraulic pressure from the prior art load cell resulting in inaccuracy of the weight or force measurement. The hydraulic load cell made in accordance with the invention maintains much greater accuracy under varying temperature conditions.

The invention has a number of advantages over prior art temperature compensation approaches. The compensating insert requires no maintenance or calibration during use. Since compensation takes place in the cell base the fluid, base and insert are all subjected to the same temperatures. With the insert in the cell base no additional possible point of leakage is added to the load cell weighing system. Further, temperature compensation is provided under loaded or unloaded conditions to prevent inaccuracies over the whole range of load cell operation.

It should be understood that the term "hydraulic load cell" as used in the claims includes similar hydraulic pressure devices utilizing hydraulic fluid pressure foot transmitting force indication and wherein it is desirable to compensate for inaccuracies due to temperature changes.

It will thus be seen that the objects set forth above, among those made apparent from the preceding description, are efficiently attained and, since certain changes may be made in the above construction without departing from the scope of the invention, it is intended that all matter contained in the above description or shown in the accompanying drawings shall be interpreted as illustrative and not in a limiting sense.

It is also to be understood that the following claims are intended to cover all of the generic and specific features of the invention which, as a matter of language, might be said to fall therebetween.

Having described my invention, what I claim as new and desire to secure by Letters Patent is:

1. A hydraulic load cell comprising, in combination:
   (A) a base having
      (1) means forming a cavity therein,
      (2) means forming a depression in said cavity, and
      (3) means forming a fluid passage through said base from said cavity and then to a pressure sensitive device;
   (B) a diaphragm overlying said cavity,
      (1) means for sealing said diaphragm around the periphery of said cavity to form a fluid chamber;
   (C) a fluid confined in said chamber;
   (D) means for transmitting a weight or force to said diaphragm to affect the pressure of fluid in said chamber; and
   (E) an insert positioned in said base within said depression,
      (1) said insert having a substantially flat surface portion disposed in said cavity,
         (a) said flat surface portion being normally closely spaced from said diaphragm,
      (2) said insert having a coefficient of thermal expansion less than said base and said fluid, and
      (3) said insert having a fluid displacing volume substantially equal to the volume of fluid in said chamber multiplied by the ratio of the cubical coefficients of expansion of said fluid to said base whereby temperature changes affecting the fluid volume in said chamber and the volume of said chamber are substantially compensated for by the presence of said insert, and the flat surface of said insert serving as a rest for said diaphragm when the load cell has insufficient fluid in said chamber.

2. The hydraulic load cell defined in claim 1 wherein a pressure transducer is fitted in said base and connected to said fluid passage whereby temperature changes in said fluid are essentially the same as temperature changes in said base and said insert.

References Cited by the Examiner
UNITED STATES PATENTS

| | | | |
|---|---|---|---|
| 2,037,949 | 4/36 | Tate | 73—141 X |
| 2,087,494 | 7/37 | Annin. | |
| 2,235,314 | 3/41 | Diggins et al. | |
| 2,960,328 | 11/60 | Tate | 177—254 |

RICHARD C. QUEISSER, *Primary Examiner.*

DAVID SCHONBERG, *Examiner.*